US005586289A

United States Patent [19]
Chin et al.

[11] Patent Number: 5,586,289
[45] Date of Patent: Dec. 17, 1996

[54] METHOD AND APPARATUS FOR ACCESSING LOCAL STORAGE WITHIN A PARALLEL PROCESSING COMPUTER

[75] Inventors: Danny Chin, Princeton Jct.; Joseph E. Peters, Jr., East Brunswick; Herbert H. Taylor, Pennington, all of N.J.

[73] Assignee: David Sarnoff Research Center, Inc., Princeton, N.J.

[21] Appl. No.: 228,465

[22] Filed: Apr. 15, 1994

[51] Int. Cl.$^6$ ........................................ G06F 13/14
[52] U.S. Cl. ..................... 395/438; 395/478; 395/806; 364/230; 364/238.4; 364/242.3; 364/242.91; 364/DIG. 1
[58] Field of Search .......................... 395/800, 200.01, 395/200.13, 200.15, 841, 298, 305, 478, 494, 559, 860, 871, 298, 305, 427, 438, 445, 448, 453, 476, 477, 726, 200.08, 728, 732, 857; 365/189; 364/131–134

[56] References Cited

U.S. PATENT DOCUMENTS

| 4,344,134 | 8/1982 | Barnes | 364/200 |
|---|---|---|---|
| 4,412,286 | 10/1983 | O'Dowd | 364/200 |
| 4,414,624 | 11/1983 | Summer | 364/200 |
| 4,636,944 | 1/1987 | Hodge | 364/200 |

(List continued on next page.)

OTHER PUBLICATIONS

S. B. Wu and M. T. Liu, "A Cluster Structure as an Interconnection Network for Large Multimicrocomputer Systems" IEEE Transactions on Computers, vol. 3–30, pp. 254–264 (Apr. 1981).

F. Pittelli and D. Smitley, "Analysis of a 3D Toroidal Network for a Shared Memory Architecture" Proceedings of Supercomputing '88 (IEEE Computer Society Press, Los Alamitos, CA; 1988) pp. 42–47.

C. Germain et al. "An Interconnection Network and a Routing Scheme for a Massively Parallel Multicomputer" Third Symposium on the Frontiers of Massively Parallel Computation, Proceedings, 9 IEEE Computer Society Press; Los Alamitos CA; 1990 pp. 368–371.

"Maxion" Multiprocessor System product literature, (Concurrent Computer Corporation; Oceanport, New Jersey; Oct. 1993) 33 pages.

C. A. Robinson, Jr., "Advanced High–Speed Chips Move to Parallel Processing" Signal, Jun. 1993, pp. 23–31.

(List continued on next page.)

Primary Examiner—Alpesh M. Shah
Attorney, Agent, or Firm—William J. Burke

[57] ABSTRACT

A processor within a parallel processing computer having a plurality of processors, where each processor is directly connected to a local storage memory. Each processor contains a principal processing element (PPE), a memory controller, and a multiplexor. The PPE executes a series of program instructions including local storage memory access instructions that cause the PPE to produce a local storage memory access request for accessing information within the local storage memory. The memory controller is connected to the PPE and a plurality of information resources of the parallel processing computer. This controller selectively routes local storage memory access requests from the information resources to an output port of the memory controller and generates an enable flag that is set to a first state when a selected one of the plurality of information resources can access the local storage memory and is set to a second state when the PPE is accessing the local storage such that access by the information resources is deferred until access by the PPE is complete. The multiplexor is connected to the PPE, the memory controller and the local storage memory. The multiplexor, operating in response to the enable flag, multiplexes the PPE access request with the selected information resource access requests such that access by the PPE to the local storage memory occurs substantially without time-delay interruption of the execution of program instructions by the PPE.

10 Claims, 7 Drawing Sheets

U.S. PATENT DOCUMENTS

| | | | |
|---|---|---|---|
| 4,716,525 | 12/1987 | Gilanyi et al. | 364/200 |
| 4,736,363 | 4/1988 | Aubin et al. | 370/60 |
| 4,740,954 | 4/1988 | Cotton et al. | 370/60 |
| 4,796,232 | 1/1989 | House | 365/189 |
| 4,809,362 | 2/1989 | Claus et al. | 455/607 |
| 4,837,676 | 6/1989 | Rosman | 364/200 |
| 4,866,668 | 9/1989 | Edmonds et al. | 364/900 |
| 4,965,718 | 10/1990 | George | 364/200 |
| 5,018,133 | 5/1991 | Tsukakoshi et al. | 370/16 |
| 5,038,282 | 8/1991 | Gilbert et al. | 395/200.01 |
| 5,105,424 | 4/1992 | Flaig et al. | 370/94.1 |
| 5,109,379 | 4/1992 | Kume et al. | 370/94.3 |
| 5,113,523 | 5/1992 | Colley | 395/800 |
| 5,117,430 | 5/1992 | Berglund | 370/85.1 |
| 5,121,502 | 6/1992 | Rau | 395/8 |
| 5,125,076 | 6/1992 | Faber et al. | 395/200 |
| 5,129,077 | 7/1992 | Hillis | 395/800 |
| 5,175,865 | 12/1992 | Hillis | 395/800 |
| 5,197,140 | 3/1993 | Balmer | 395/400 |
| 5,388,217 | 2/1995 | Benzschawel et al. | 395/856 |

OTHER PUBLICATIONS

Z. G. Vranesic et al., "Hector: A Hierarchically Structured Shared–Memory Microprocessor" Computer, Jan. 1991, pp. 72–79.

R. Alverson et al, Conference Proceedings, 1990 Conference On Supercomputing, "The Tera Computer System" Association for Computing Machinery, 1990) pp. 1–6.

METHOD AND APPARATUS FOR ACCESSING LOCAL STORAGE WITHIN A PARALLEL PROCESSING COMPUTER

The invention is directed to parallel computers having a plurality of processors for processing information in parallel. More particularly, the invention comprises parallel computers in which each processor has associated with it dedicated local storage which can be independently and asynchronously accessed by others of the plurality of processors, as well as a plurality of other information resources.

BACKGROUND OF THE INVENTION

A parallel computer conventionally includes a large number of processors together with information-transfer channels to exchange information among the processors, and to pass information between the processors and input/output (I/O) ports of the computer. Each processor of such a computer has associated with it dedicated local storage which the processor can access in response to instructions executed by the processor.

In a parallel computer of the dedicated local storage type, accessing the dedicated local storage associated with a given processor involves execution of a local instruction by the given processor. Execution of one of these steps can delay running of a program by the given processor. In addition, other information resources, such as a host processor, also require access to local storage which can also result in delayed execution by a given processor. Such delays to accommodate access to the dedicated local storage can represent a significant computational burden in a parallel computer, and tends to reduce its computing efficiency. In addition, synchronization of the running of programs by the various processors is often a critical requirement to achieve computing efficiency in the machine. Programming the machine to achieve the desired synchronization between the various processors, while accommodating access to the dedicated local storage is in general a time-consuming and tedious task. In some cases, this is practically impossible, since the time to run the programs on the various processors can depend upon the data being processed which may be unknown at the time the computer is programmed.

The problem of efficiently accessing dedicated local storage by a plurality of parallel processors has been addressed in certain prior art patents.

For example, in U.S. Pat. No. 4,837,676 a computer architecture is described which attempts to achieve highly parallel execution of programs in instruction flow form. In this patent, individual units, such as process control units, programmable function units, and memory units are individually coupled together by an interconnection network as self-contained units. Each process control unit initiates its assigned processors in sequence, routing instruction packets for each process through the computer network and an address network in order to provide time share of a single communications highway by multiple instruction packet streams.

Similarly, in U.S. Pat. No. 4,344,134 a parallel processing array is described in which each processor issues a ready signal to signify that it is ready to begin a parallel processing task, and institutes the task upon receipt of an initiative signal. Parallel processing is enhanced by partitioning processing functions into plural process sub-arrays, via a control node tree, the node tree having a plurality of control nodes connected to the plurality of processors.

In U.S. Pat. No. 5,121,502 a computer is described which includes a processing unit, an instruction unit, and means for communicating instructions from the instruction unit to the process unit, wherein the processing unit includes a plurality of processors. The instruction unit includes a plurality of storage locations, and means are provided which include a first connection circuit for providing a plurality of parallel connection circuits between storage locations and the processor, and a second connection circuit for providing a single serial communication channel between the storage locations and the processors. The system further includes a control circuit for selecting between the first and second connection circuits, where the first connection circuit is selected when a multi-operation instruction is to be executed, and the second circuit is selected if such an instruction is not present.

Similar systems are shown in U.S. Pat. Nos. 4,965,718 and 5,113,523.

Although the foregoing patents have attempted to increase the operating efficiency of massively parallel computing machines, they have not accomplished the increased efficiency anticipated by the instant invention. More particularly, the instant invention provides predetermined additional hardware to monitor memory ports of a plurality of processors to determine instruction cycles, during which the memory ports are inactive, and to use those cycles to store asynchronously arriving data into local memory. In so doing, the instant invention provides additional efficiency in a parallel computer by providing: (1) an arbitration method for selecting an active data source; (2) an asynchronously and autonomous method for transferring data between a data source and memory while a program is being simultaneously executed; (3) conditional means of data transfer; and (4) selective hardware to transfer MIMD programs from local memory to on-chip instruction.

SUMMARY OF THE INVENTION

The invention is a parallel computer comprising a plurality of processors, with respectively associated dedicated local storage connected thereto, under the control of a system controller, an input/output (I/O) port, an inter-processor communications channel (IPC) interconnecting the processors under the control of a particular system controller, input/output (I/O) communication channel interconnecting the processors and the I/O port and a controller communication channel interconnecting the system controller and the processors under its control. Each of the processors comprises a principal processing element (PPE) connected to the local storage associated with the processor, the PPE being adapted to execute program sequences of instructions, which include local-storage-access instructions for accessing information in the dedicated local storage, and a memory control unit connected to the local storage associated with the processor, the memory control unit being adapted to identify local-storage signaling requests by a plurality of information resources of the computer, other than the PPE, to access the local storage associated with the processor substantially without time-delay interruption of the execution of program sequences of instructions by the PPE, to transfer information between said local storage and one of the plurality of information resources of the computer so identified during times at which the PPE is not accessing the local storage and to defer such transfer until the PPE utilization of the local storage is completed.

The invention is also a method for accessing a plurality of dedicated local storage devices respectfully associated with a plurality of processors connected in parallel comprising the steps of utilizing a principal processing element (PPE) associated with each of the processors to execute program sequences of local-storage-access instructions for accessing information stored in the local storage, identifying local storage signaling requests by predetermined information resources of the computer, accessing, in response to the signaling requests, predetermined local storage devices substantially without time-delay interruption of program sequence execution by the PPE, and transferring information to and from the identified information resources during time intervals when the PPE is not accessing the local storage and deferring such transfer until the PPE utilization of the local storage is completed.

DETAILED DESCRIPTION

Figure 1:
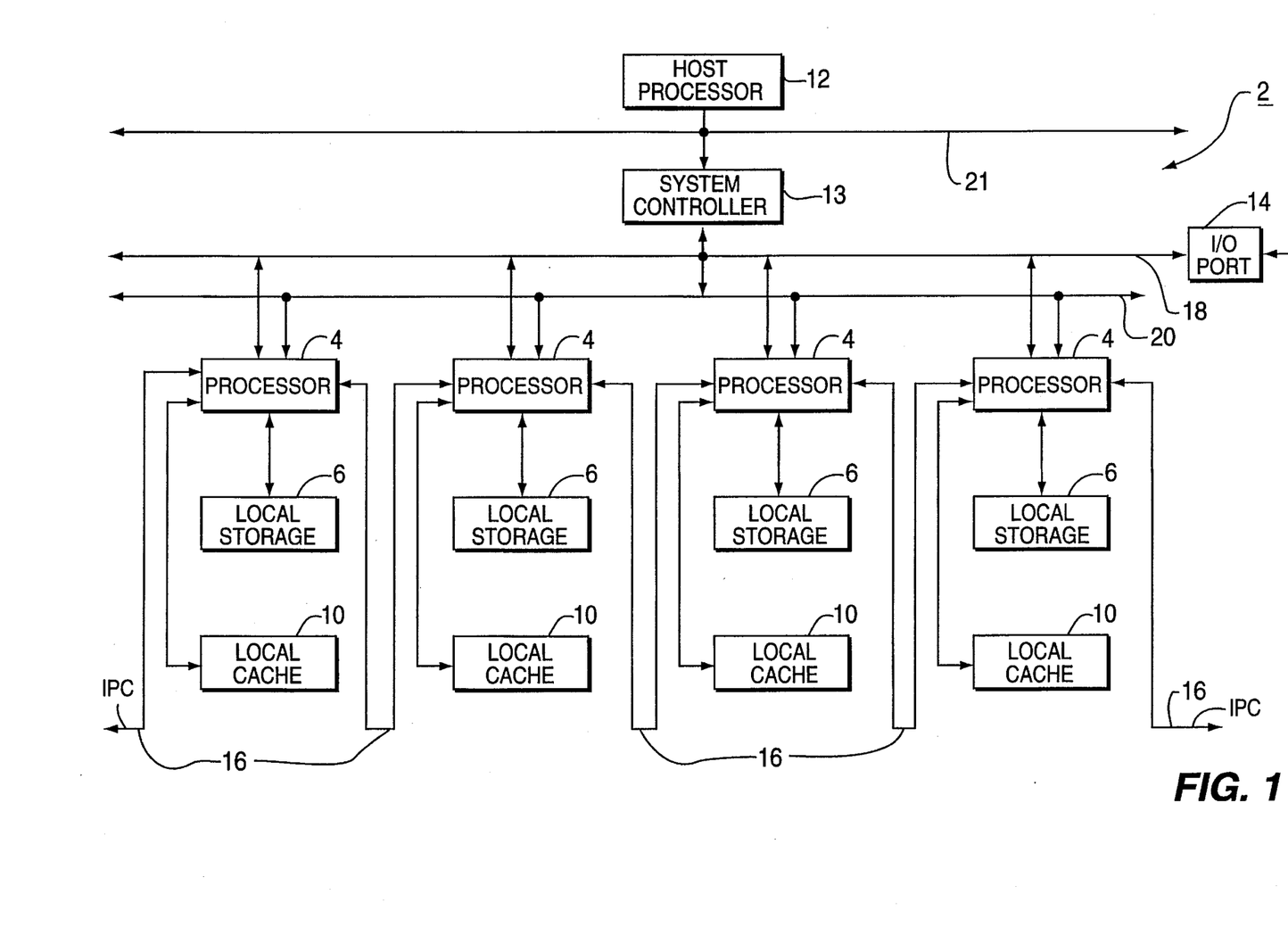
FIG. 1 is a block diagram of a parallel computer illustrative of the invention.

In FIG. 1, a computer 2 includes a plurality of processors 4, only four of which are shown. The processors 4 are typically divided into groups of 64 processors, with each group having a processor group controller associated with it. The architecture of a preferred computer is described in detail in U.S. patent application, Ser. No. 08/091,935, filed Jul. 12, 1993, now abandoned, which is a continuation-in-part of U.S. patent application, Ser. No. 07/926,755, filed Aug. 5 1992, now abandoned, and in U.S. patent application Ser. No. 08/228,467, filed Apr. 15, 1994, and entitled "PARALLEL PROCESSING COMPUTER CONTAINING A MULTIPLE INSTRUCTION STREAM PROCESSING ARCHITECTURE", each of which is incorporated herein by reference as if fully set out herein.

Each digital processor 4 has connected thereto dedicated local storage 6 and a local-instruction cache 10. Each processor 4 is adapted to process information in response to program sequences of instructions stored in the cache 10. The instructions include local-memory-access instructions for reading, loading, or otherwise accessing information in the local storage 6.

The computer 2 also includes a host processor 12, a system controller 13 and a I/O port 14. The processors 4 are interconnected by an interprocessor communications channel (IPC) 16. An input/output (I/O) communication channel 18 interconnects the processors 4 and the I/O port 14. A controller communication channel 20 connects a group of processors 4 and the system controller 13 for that group. The channel 18 and the channel 20 are ported to each of the processors 4. System controllers 13 are connected to one another and the host processor 12 by bus 21. It is understood that the parallel computer of the invention can comprise one or more system controllers, each controlling a plurality of processors 4.

Figure 2:
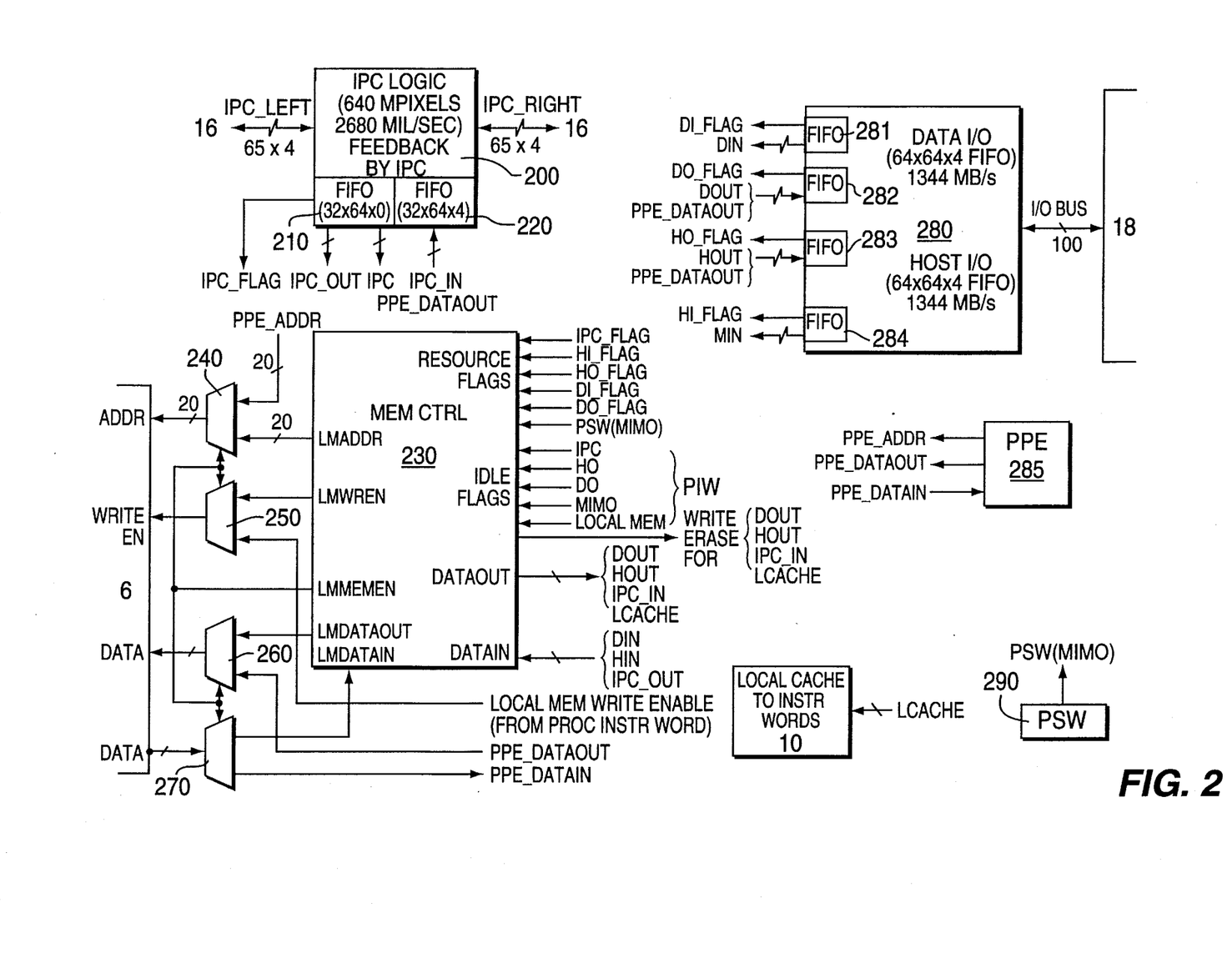
FIG. 2 is a block diagram of a processor and associated dedicated local storage of a preferred embodiment of the invention.

In FIG. 2, there is shown a block diagram of the interconnection of the subsystems included within each of the processors 4 needed to determine instruction cycles during which the memory ports are inactive, and to use those cycles to store (or read) asynchronous data into (or out of) local memory. In so doing, the hardware shown in FIG. 2 provides an arbitration method for selecting an active data source, an asynchronous and autonomous method for transferring data between a data source and memory while a program is being simultaneously executed and a conditional means of data transfer.

More particularly, the circuitry must control access to local memory 6 from the IPC bus 16, and the I/O bus 18. The circuitry is contained within each of the processors 4 shown in FIG. 1, and consists of IPC logic 200, a memory control (MEM CTRL) unit 230, a data and host I/O logic 280, a principal processing element (PPE) 285, a Local Cache 10, and an input for the Processor Status Word (PSW) unit 290. A predetermined bit of the PSW is a signal by the processor that indicates local memory is in a loading process for the local cache 10 and, thus, access must be delayed until loading is completed.

Included within the IPC logic 200 are First-In, First-Out (FIFO) buffers 210 and 220. Similarly, logic 280 contains FIFOs 281–284, while the MEM CTRL unit 230 accesses local memory 6 via multiplexers (MUXs) 240, 250, 260 and 270.

In normal operation, the PPE 285 always has access to local memory 6. Local memory 6 is accessed by providing an address (PPE Addr) to MUX 240, and then either storing data via the PPE Data Out connection to MUX 260, or reading data from local memory via the PPE Data-In connection. The instant invention serves to create an access to local memory at any time that local memory is not being used by the PPE.

The key to providing such access is to determine any processing cycle that is not being used by the PPE 285. This is accomplished by a flag set by the Local Mem Idle Flag that selects the output of MUXs 240, 250, 260 and 270 input to MUX 260. The information for generating this flag is provided by a Processor Instruction Word at the time a particular program is being compiled. Based on that particular flag, the MEM CTRL unit 230 knows when local memory 6 is available for a read or write operation.

Access to memory 6 is controlled by MEM CTRL unit 230. Such control is based on the Local Mere Memory Enable (LMMemEn) flag described above, as well as a group of resource flags and a group of idle flags.

The resource flags function to indicate when a particular resource is requesting the ability to transmit or receive data. For example, setting the IPC resource flag indicates that data is stored in FIFO 210, which data is available for storage in local memory 6 when local memory is available. Similarly, the HI resource flag indicates that data is present in FIFO 284, the HO resource flag indicates that data is available in FIFO 283, the DI resource flag indicates that data is available in FIFO 281, and the DO resource flag indicates that data is available in FIFO 282. The PSW (MIMD) flag indicates that data in local memory should be loaded into local cache 10.

It is, of course, understood that FIFO 281 handles incoming data from I/O Bus 18, FIFO 282 handles outgoing data out to I/O Bus 18, FIFO 283 handles outgoing data to host processor 12, and FIFO 284 handles incoming data from the host processor.

The idle flags serve to indicate when a particular resource is available for a write operation, and are operative to ensure that an attempt to use these resources is not made at a time when the resource (or local storage) is being used by the PPE. The idle flags include a flag for the IPC resource 200, the Host Logic (FIFOs 281, 282), the MIMD resource (PSW register 290), and the local memory resource (Local Cache 10).

The DOut terminal of MEM CTRL 230 serves to send data to the Data-Out FIFO 282, the HOut terminal serves to send data to the Host via FIFO 283, the IPC IN terminal serves to send data to the IPC FIFO 220, and the L Cache terminal serves to send data to the Local Cache 10.

Similarly, the DIn terminal of MEM CTRL 230 accepts incoming data from DIn FIFO 281, the HIn terminal accepts data from FIFO 284, and the IPCOut terminal accepts data from FIFO 210. Also, the PPE DATA-Out terminal accepts data from PPE 285 at MUX 260, while outgoing data from memory 6 is transferred to the PPE 285 via MUX 270. MUX 270 can also transfer data stored in memory 6 directly to MEM CTRL 230.

The LMMemEn output of MEM CTRL selects whether the memory access source is the PPE 255 or MEM CTRL 230. In addition, the LM Data-Out output permits data transfer into memory 6, while the LM Wr En output enables MUX 250 for a write operation, and the LM Addr output allows an address to be applied to memory 6.

Figure 3:
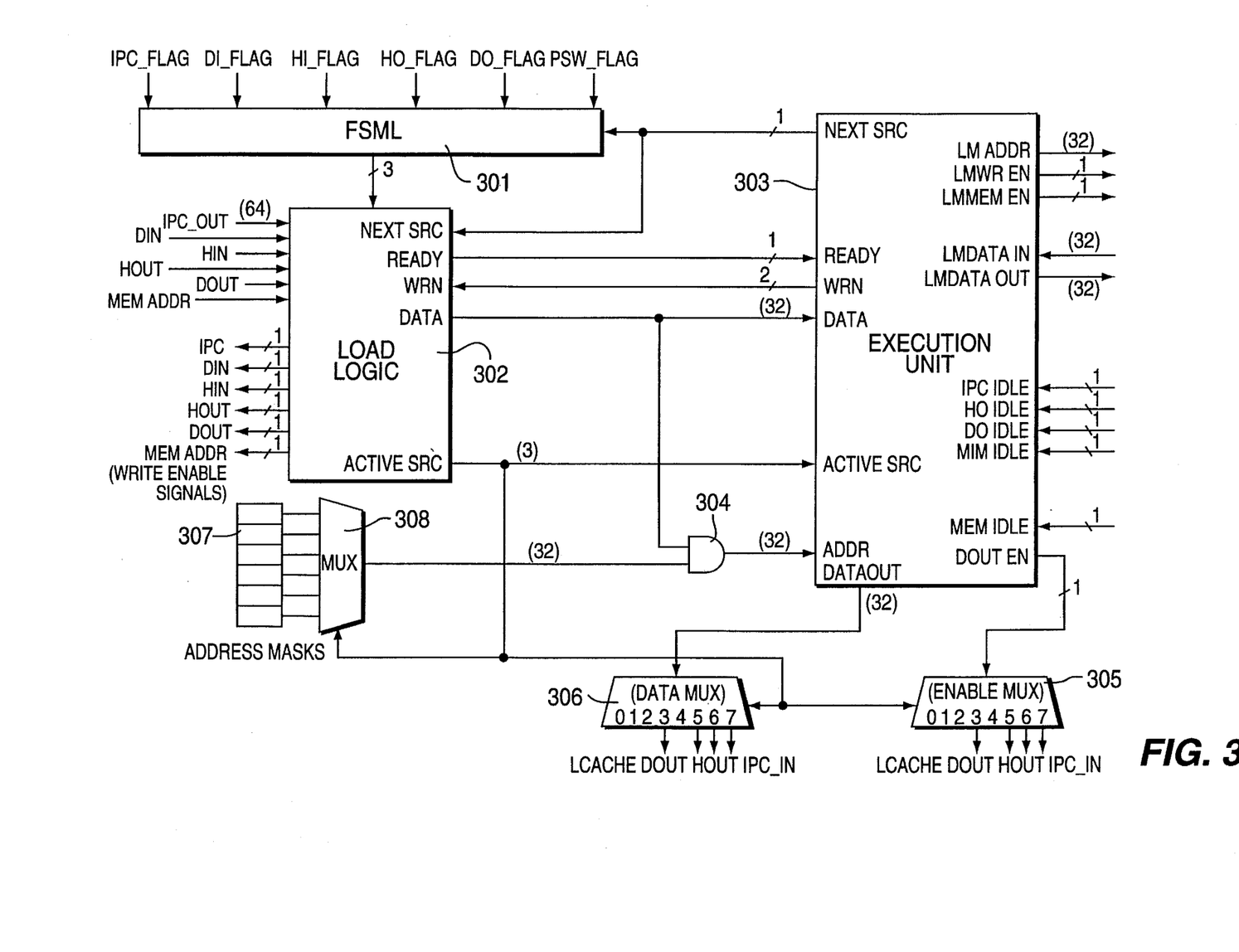
FIG. 3 is a block diagram of the memory control circuit of FIG. 2.

In FIG. 3 there is shown in greater detail the logic included within the MEM CTRL unit 230 of FIG. 2. The circuitry in FIG. 3 consists of Finite State Machine Logic (FSML) 301, Load Logic 302, Execution Unit 303, Gating Logic 304, Enable MUX 305, Data MUX 306, Address Masks 307, and MUX 308.

The function of FSML 301 is to monitor the incoming resource flags, described with respect to FIG. 2, preferably on a round robin basis. FSML 301 acts as an arbitrator to ensure that each resource has an equal chance of being chosen. This, of course, is to prevent the situation where a particular resource is never chosen for access to local memory. The output of FSMC 301 is a 3 bit word which indicates to Load Logic 302, which particular resource has been chosen.

The primary inputs to Load Logic 302 are IPC Out, DIN, HIN, HOUT, DOUT, and Mem Addr, the function of which has been explained with respect to FIG. 2.

The primary output of the Load Logic is either address plus data for storage in local memory, or just the address that will be needed in order to read data from local memory.

The outputs IPC, DIN, HIN, HOUT, DOUT and Mem Addr are single bits which function as part of a hand-shaking routine so that the various resources (FIFOs) know to update when data has been read by local logic.

The Load Logic outputs "Ready" and "Active SRC", as well as the input "Next SRC", are all used as part of a handshaking routine between the Load Logic and the Execution Unit. The purpose is for the Load Logic to signal to the Execution Unit when the data has been loaded into one of two double buffers included within the Local Logic and when the Execution Unit can begin processing the data which has been moved from one or the other of the double buffers.

Address Masks 307 and MUX 308, in conjunction with AND gate 304, serve to mask preselected bits from the data forwarded from the Load Logic to the Execution Unit. This function serves to separate the address from the data being forwarded to the Execution Unit.

The remaining outputs and inputs for Execution Unit 303 have all been explained with respect to FIG. 2. Output data from the Execution Unit 303 is handled by MUX 305 and 306 in the manner described above.

Figure 3A:
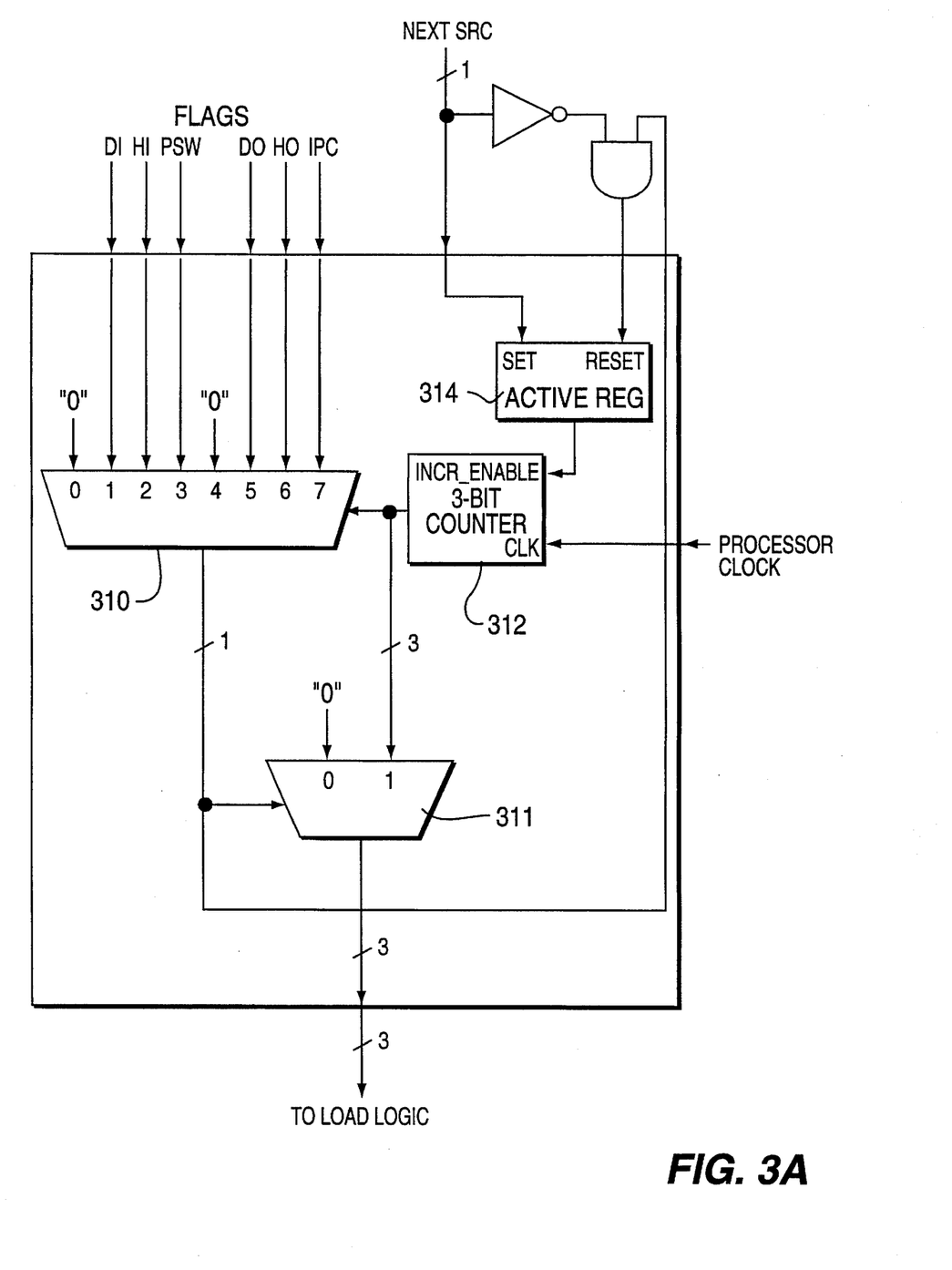
FIG. 3A is a block diagram of the finite state machine logic of FIG. 3.

In FIG. 3A, a more detailed description of the FSML logic previously described with respect to FIG. 3 is shown.

The flag inputs into MUX 310, which include DI, HI, PSW, DO, HO, and IPC, have been previously described. In addition, there are two "0" bit inputs. Each of the eight inputs into MUX 310 is associated with a three-bit binary number which encodes one of the digits 0–7.

Also applied to MUX 310 is a three-bit input from flag-polling counter 312. Counter 312 is driven at its clock input by the processor system clock (not shown), which provides clock timing signals for all of the processors. Counter 312 is adopted to cycle through the eight three-bit binary codes in a cyclical fashion in response to the processor clock signals when a signal of logic level "1" is applied to counter 312 from Active Register 314. A logic level "0" results in counter 312 maintaining its present value.

MUX 311 is a two-by-three MUX having one input port assigned a three-bit binary code "000". The other input port is connected to the output of counter 312.

Flip-flop 314 serves to enable counter 312 upon receipt of the next SRC signal which "sets" flip-flop 314.

Figure 4:
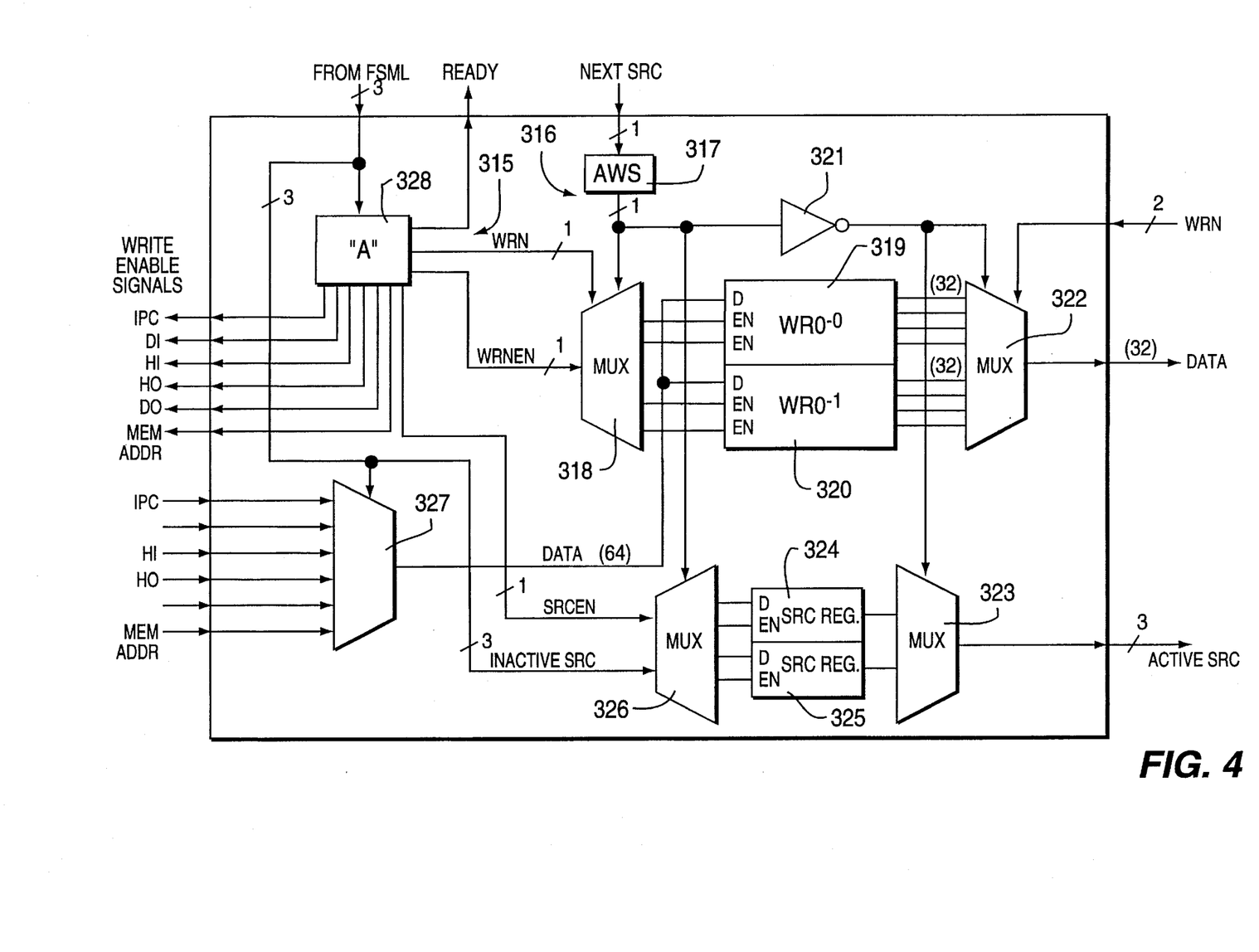
FIG. 4 is a block diagram of the load logic element of FIG. 3.

As shown in FIG. 4, the Load Logic includes a sequencer circuit 315 and a buffer circuit 316. The circuit 315 has six 64-bit-wide information input ports into MUX 327 for receiving information packets, each of which is associated with one of the six locally ported information resources, as described above.

The circuit 315 also includes six output ports (IPC, DI, HI, HO, DO, Mem Addr) for transmitting control signals respectively for signaling the completion of the loading of incoming information packets associated with a corresponding one of the six locally-ported information handling facilities. The Load Logic also includes a "Ready" output port and an input port from the FSML (described above).

Load-sequencer circuit 328, (see Box A) has six one-bit-wide output ports which constitute the flag-reset control-signals described above. In addition, circuit 328 has an output port "WRn", an output port "WRnEn", and output port "Ready", and an output port "SRCEn". Sequencer 328 includes an input port from FSML, which is also connected to an input port of MUX 327 and MUX 326.

Circuit 315 also includes a MUX 327, which is a 6-by-64 MUX having six input ports (IPC, DI, HI, HO, DO and Mem Addr), a data output port, and the input port from the FSML. The six input ports of the MUX 327 have been described above.

Circuit 328 is a logic circuit which performs load-sequencing operations in response to code signals applied to the input port from the FSML.

In operation, sequencer circuit 328 executes a load-sequencing operation whenever the code encoded by the FSML changes from any of the identifier codes or a no-request code to any new identifier code. More particularly, a load sequencing operation is executed whenever any of the binary codes corresponding to the digits 0, 1, 2, 3, 5, 6, 7 changes to any of the binary codes corresponding to one of the six digits 1, 2, 3, 5, 6, and 7, provided that the new identifier code is different from the immediately prior code. Depending on the identity of the new identifier code, the load-sequencing operation is either two cycles long or three cycles long. Specifically, when the code signal changes from any of the seven enumerated codes to an identifier code other than the binary code "111" which corresponds to the resource facility, a two-cycle load-sequencing operation is executed. When the signal changes from encoding any of the binary codes corresponding to the six digits 0, 1, 2, 3, 5 and 6 to the binary code "111" of the resource facility, a three-cycle load sequencing operation is executed to accommodate the longer length of the incoming information packet associated with the IPC channel compared to the incoming information packets associated with the other information resources.

The two-cycle load-sequencing operation is as follows:

First Cycle: Assert a "0" logic signal at the WRn output; assert a "1" logic signal at the SRCEn output port; assert a "1" logic signal at the WRnEn output port.

Second Cycle: Assert a "1" logic signal at the Ready output port; assert a "1" logic signal for one of the outputs IPC, DI, HI, HO, DO, and Mem Addr as determined by the three bit FSML code.

When the sequencer circuit 328 detects a change in the code signal from the FSML from any of the seven codes enumerated above other than the "111" binary code to "111", the following three-cycle sequence is executed by the load-sequencer circuit:

First Cycle: Assert a "0" logic signal at the WRn output port; assert a "1" logic signal at the output SRCEn output port; assert a "1" logic signal at the WRnEn output port.

Second Cycle: Assert a "1" logic signal at the WRn output port; assert a "1" logic signal at the WRnEn output port.

Third Cycle: Assert a "1" logic signal at the Ready output port; assert a "1" logic signal at one of the output ports IPC, DI, HI, HO, DO, and Mere Addr as determined by the three bit FSML code.

Circuit 316 includes a first working register 319, and a second working register 320. Each working register 319, 320 includes a 128-wide subbank register which is wired to the corresponding subbank load input port as two separately-load-enabled 64-bit-wide subbank-register portions and wired to the corresponding read output port as four disjoint 32-bit-wide subbank-register portions. The first and second working registers 319 and 320 are adapted to load separately each of the four 64-bit-wide inputs in response to a control signal applied to the input ports.

Circuit 316 also includes demultiplexer (deMUX) 318. The deMUX 318 is a 1-by-4 deMUX having a one-bit-wide input port, a pair of first output subports, a pair of second output subports, and a control-signal input port.

The input port of the deMUX 318 is a 2-bit-wide input port which is connected to an output port of the circuit 328. Circuit 316 also includes a control-signal flip-flop 317. The flip-flop 317 has a working register selection toggle input port from the Next SRC signal, and an output port connected to an input port of the deMUX 318.

The circuit 316 further includes a MUX 322, which is a 32-by-8 MUX having two input ports connected to the working registers 319 and 320. The output port of MUX 322 is the DATA Output described above.

MUX 322 also has an input port connected to the WRn signal and an input port connected to the output of invertor 321. Since the control signals from the AWS flip-flop 317, applied to MUX 318 and MUX 322, are inverted with respect to one another, one of the working registers 319 is selected for loading, while the other of the working registers 320 are selected for reading.

As may be seen in FIG. 4, the circuit 316 also includes a first SRC register 324, and a second SRC register 325. Each of the registers 324, 325 is a 3-bit-wide register for storing 3-bit SRC codes. Each register 324, 325 has a corresponding input port connected to deMUX 326, and an output port connected to MUX 323. DeMUX 326 is a 1-by-2 deMUX having an input from SRCEn, and an input from Inactive SRC.

MUX 323 is a 3-by-2 MUX having two input ports connected to the SRC registers, and an output port which serves as the Active SRC output described above.

In operation, assertion of a control signal at the SRC En output port of the sequencer circuit 328 causes a load-enable control signal to be applied to the enable input ports of the SRC registers 324, 325, which are selected in response to the selection control signal from the output port of the AWS flip-flop 317. In response, the selected register to which the control signal is applied loads the FSML code asserted at the input of circuit 328. At the time one of the two registers 324, 325 is selected in response to the AWS control signal of a given logic level being applied to the input port of deMUX 326, the other of the two registers 324, 325 is selected for reading by the MUX 323 by virtue of a control signal of the inverse logic level being applied via invertor 321 to the input port of the MUX 323. The first and the second registers 324, 325 thus alternate between being loaded and being read in synchrony with the alternate selection of the first and the second working register subbanks 319, 320 for loading and reading as determined by the toggling of the AWS flip-flop 317.

In summary, the FSML determines which resource is to be processed by the 3-bit value in circuit 328. Circuit 328 decodes the 3-bit value and asserts the WRnEn signal to the correct resource, which data is read into the idle working register on the next cycle.

The incoming data is transferred to the Working Registers from the output of MUX 327, and outputted from MUX 322. The Active Working Set (AWS) flip-flop determines what working register is being used to accomplish the double buffering concept of the instant invention.

Figure 5:
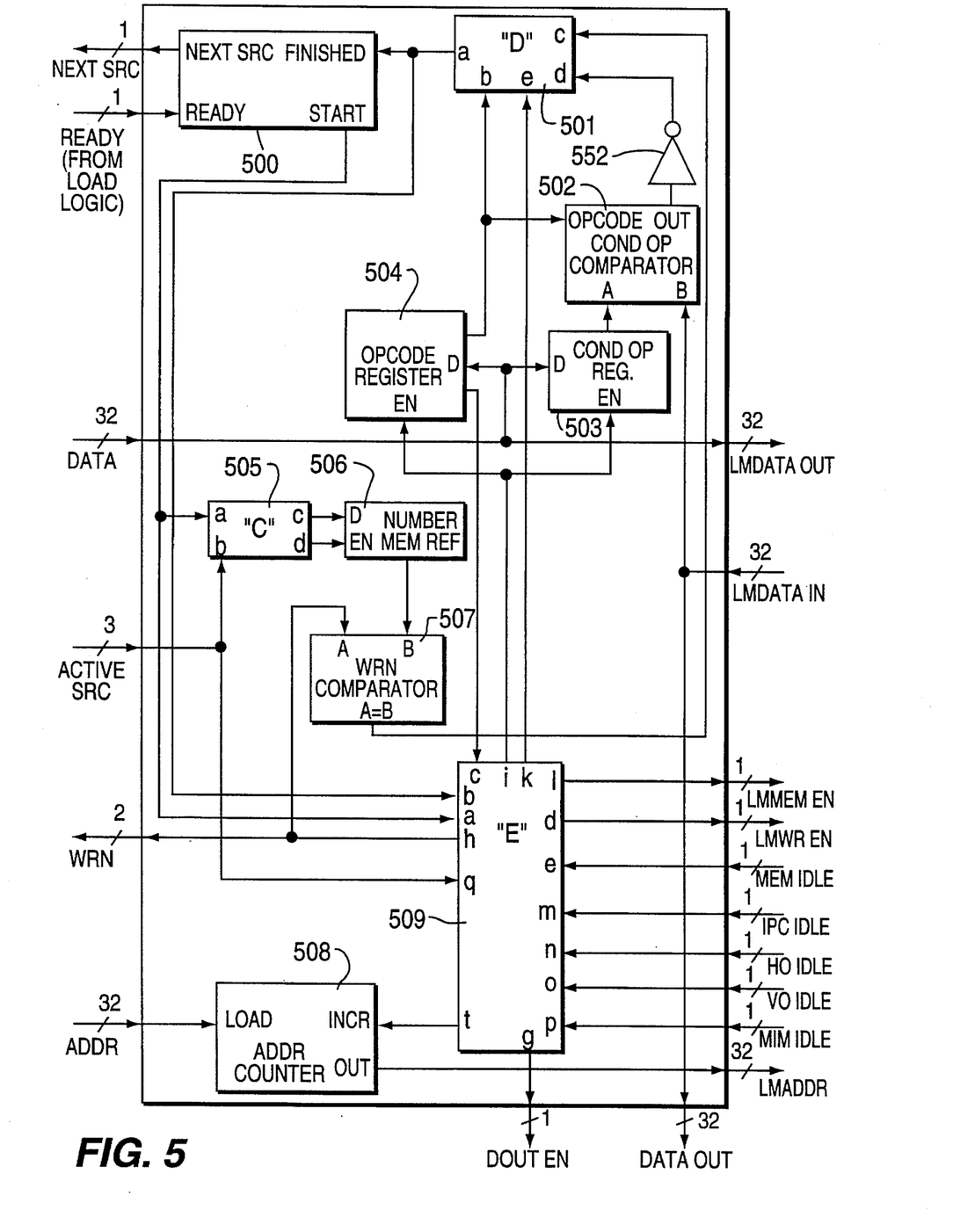
FIG. 5 is a block diagram of the execution unit of FIG. 3.

In FIG. 5, the Execution Unit consists of a "B" unit 500, a "C" unit 505, a "D" unit 501, and an "E" unit 509. Also included is Conditional Operation Comparator 502, Opcode Register 504, Conditional Operation Register 503, Register 506, Counter 508, and Comparator 507.

In operation, the "Ready" signal is applied to "B" unit 500. This indicates to the Execution Unit that there is valid data to read into the Execution Unit. Basically, the Execution Unit operates in two modes. Either the Execution Unit is already active, in which case the Ready Signal is essentially buffered so the Execution can begin operation when available.

Alternatively, the Execution Unit is inactive, in which case it is activated by the Ready signal. A Ready signal results in the generation of a "START" signal from the B unit and, upon receipt of a "Finished" signal from D unit 501, the "B" unit generates a "Next SRC" signal.

The "Active SRC" input is a 3-bit code which tells the logic circuitry which resource will be accessed. Depending on the resource, the Data input could be three 32 bit values, or one 32 bit value.

The "C" box reads the active SRC value and produces a a digital word equal to the number of words expected, which is basically how many of the working registers have valid data. That number is stored in register 506. When all of the incoming data words have been read, as determined by by the "E" unit 509, comparator 507 will generate a control signal to "D" unit 501.

The detailed description of the Execution Unit is further described as follows:

Operation of Unit "B"

Unit B maintains the state of the Execution Unit, which is either "active" or "inactive". There are two internal flip-flops: ActiveFF and WRLoadedFF. ActiveFF maintains whether the Execution Unit is in the "active" or "inactive" state.

ActiveFF is set by Unit B as described below.

ActiveFF is reset by the Finished input signal.

WRLoadedFF determines when the inactive set of Working Registers is loaded.

WRLoadedFF is set by the Ready input signal.

WRLoadedFF is reset as described below.

Assuming Unit B is initially "active", when "Finished" is asserted:

1. ActiveFF is reset.
2. The "Next SRC" signal is asserted. (Unit B is now in the inactive state).
3. WRLoadedFF is read. Case A: If WRLoadedFF is set.
4a. WRLoadedFF is reset.
5a. Start Signal asserted (for 1 cycle).
6a. ActiveFF is set. (Unit B is now in the active state). Case B: If WRLoaded FF is not set.
4b. WRLoaded FF is checked each cycle until Case A occurs.

Operation of Unit "C"

Unit C determines the number of memory references needed based on the Active SRC input. If the Active SRC is the IPC or MIMD memory, the constant "3" is loaded into the Number Mem. Ref. Register. Otherwise, the constant "1" is loaded.

1. a input: C Unit begins execution when asserted.
2. b input: Active SRC input.
3. c output: Data value to be loaded into Number Mem. Ref Reg. (1 or 3).
4. d output: Write enable to Number Mem. Ref. Reg.

Operation of Unit "D"

Unit D determines when the Execution Unit is finished executing. It has the following I/Os:

1. a output: Asserted for one cycle when Execution Unit is finished.
2. b input: The 2-bit opcode (Cond/Uncond Read/Write). This is used to determine which of the inputs c or d to read to determine if the Execution Unit is finished.
3. c input: Asserted when the WRn Comparator determines the operation is completed.
5. d input: Asserted when the condition of a conditional operation is false.
6. e input: Asserted when the comparator output (d input) is valid.

Finished is asserted when:

Opcode=Unconditional Write AND the c input is asserted.

Opcode=Conditional Write AND the c input is asserted AND the d input is not asserted.

Opcode=Conditional Write AND the d input is asserted AND the e input is asserted.

Opcode=Unconditional Read AND the c input is asserted.

Opcode=Conditional Read AND the c input is asserted AND the d input is not asserted.

Opcode=Conditional Read AND the d input is asserted AND the f input is asserted.

Operation of Unit "E"

Unit E determines when local memory accesses can occur. It has the following I/O:

1. a input: E Unit starts execution when a input asserted.
2. b input: E Unit stops execution when b input asserted.
3. c input: The opcode of the operation (Cond/Unconditional Read/Write).
4. d output: Asserted when a Local Memory Write can occur (LMWrEn signal).
5. e input: MemIdle input.
6. f output: Increments Addr Counter for next memory access.
7. g output: Asserts EnStore to Store Logic (when a Cond/Unconditional Read occurs).
8. h output: Specifies WRn value for read of Working Registers.
9. i output: Enables loading of Opcode, COR Register.
10. k output: Signals "D" Unit to read Comparator input.
11. l output: Asserts LMMemEn, which specifies that HL is providing the address.
12. m input: Asserts IPCIdle, which specifies that data can write to the IPC.
13. n input: Asserts HOIdle, which specifies that the data can write to the Host Processor.
14. o input: Asserts DOIdle, which specifies that data can write to the DO.
15. p input: Asserts MIMDIdle, which specifies that data can write to the MIMD memory.
16. q input: Specifies Active SRC, so appropriate Idle signal is chosen.

Execution: Unit E Starts Operation When An A Input Is Asserted

When a input asserted, internal WRn counter reset to 0. (WRn value stored in 2 bit counter 632).

The i output is asserted to Enable the loading of COR 503, Opcode Reg. 504, which is loaded with WR0, coming into the Execution Unit via the Data path. The opcode (input c) is read.

If (input c==Conditional Op):

On cycle of MemIdle (e input) signal,
    Assert i signal (LMMemEn) to read memory.
On cycle following MemIdle (e input) signal:
    Assert k output, which signals "D" Unit to read CondOp comparator, 502 output.
        (Data from LMDataIn is compared to COR by the CondOp comparator on this cycle).
    Assert F output signal (increments Addr Counter)
Until b input asserted:
    (if Conditional Operation evaluates false, "D" unit will assert b input signal).
    (if Conditional Operation evaluates true or Unconditional Operations, then "D" unit asserts b input signal when WRn Comparator determines that all the data is processed.

If (input c==Conditional/Unconditional Write):
On MEMIdle (e input) signal:
  Write WRn counter value to h output, increment WRn Counter.
  Assert LMWrEn (d output). (Data from WRn is passed through Execution Unit to LMDataOut).
  Assert LMMemEn (i output).
  Assert f output signal (increments Addr Counter)
If (input c==Conditional/Unconditional Read):
  On each MEMIdle (e) signal and appropriate Resource Idle signal (m, n, o, p) as chosen by q:
  Assert LMMemEn (i output). (Memory location by LMAddr is read).
  Write WRn counter value to h output, increment WRn Counter. (WRn value sent to Store Logic, and WRn Comparator.
On the following cycle:
  Assert ENStore (g output). (Data from LMDataIn sent on to SData).
  Assert f output signal (increments Addr Counter).

Figure 6:
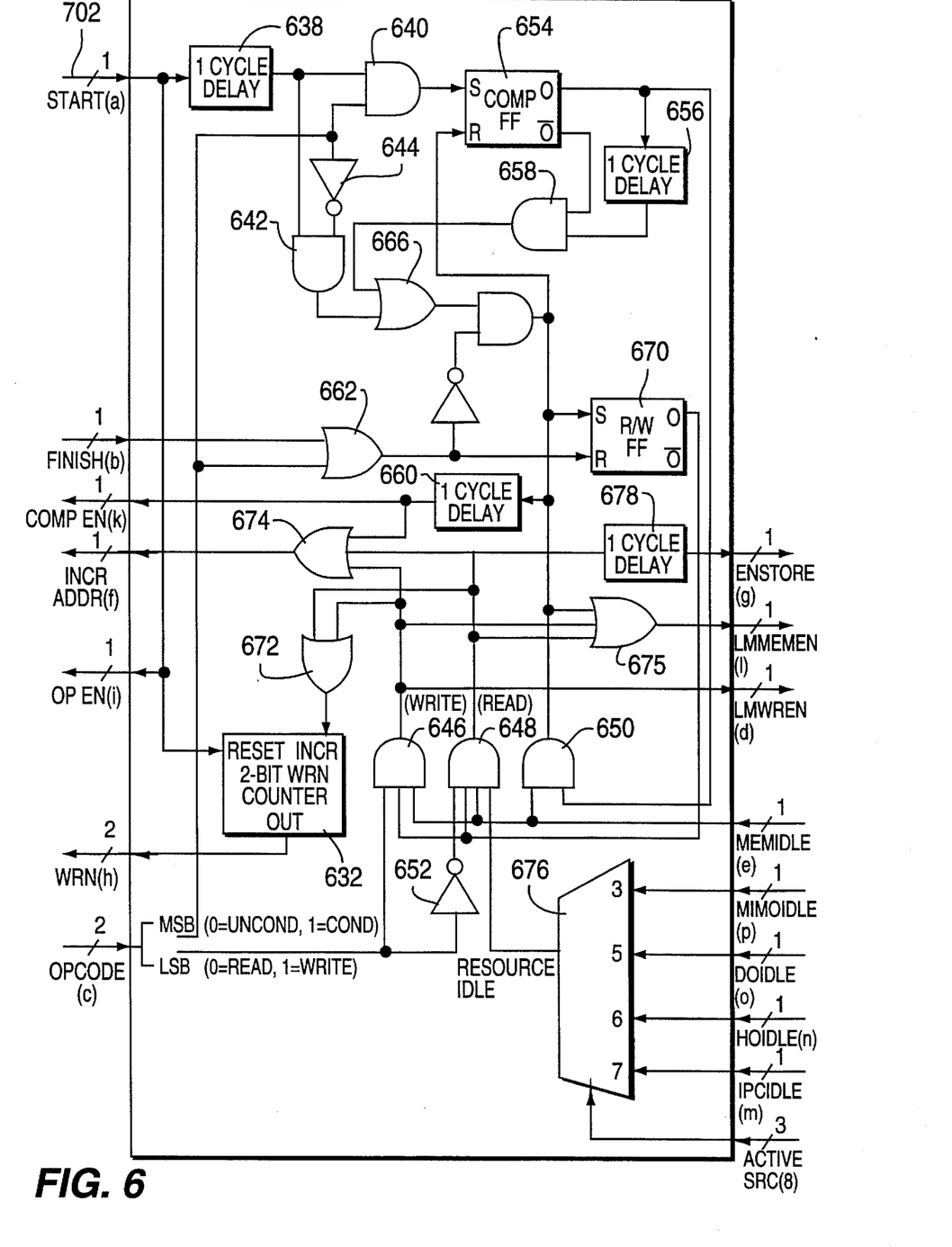
FIG. 6 is a block diagram of the "E" unit of FIG. 5.

In FIG. 6, which shows the E unit in greater detail, there is included a Start input port 702, a FINISH input port, a 2-bit-wide Opcode input port, a CompEn control-signal output port, and a WRn signal output port. The circuit in FIG. 6 also includes a 3-bit-wide Active SRC input port, a MIMD Idle input port, a DO Idle control-signal input port, a HO Idle control-signal input port, and an IPC Idle control-signal input port. The circuit in FIG. 6 also includes a MEM Idle input port, an Incr Addr output port, an LMMemEn output port, and LMWrEn control-signal output port.

Also included is a 2-bit counter 632. The counter 632 includes a Reset input port, an Incr input port, and a 2-bit-wide output port, which is the WRn output port.

Also included in FIG. 6 is a delay unit 638, a two-input AND gate 640, a two-input AND gate 642, and a control-signal invertor 644. A one-cycle-delayed output port of the delay unit 638 is connected in parallel to respective input ports of the AND gate 640 and the AND gate 642. The other of the two input ports of the gate 640 is connected to a higher-order-bit-position Opcode terminal.

Also included is a three-input-write enabling AND gate 646, a four-input read enabling AND gate 648, and a two-input read/compare-enabling AND gate 650. An input port of the gate 646 is connected to a lower-order-bit-position terminal of the Opcode input port. An input of the gate 648 is connected to the lower-order-bit-position terminal of the Opcode input port across a write/read invertor 652.

Also included is a flip-flop 654, a one-cycle-delay unit 656, a two-input AND gate 658, and a one-cycle delay unit 660. The flip-flop 654 is an RS-type flip-flop having a set input port, a reset input port, a Q output port and a output port. As shown in FIG. 6, the set input port of the flip-flop 654 is connected to an output port of the gate 640. The Q output port of the flip-flop 654 is connected in parallel to an input port of the delay unit 656 and to an input port of the gate 650. An output port of the gate 650 is connected to an input port of the delay unit 660. An output port of the delay unit 660 is connected to the reset input port of the flip-flop 654. A delayed signal output port of the delay unit 656 is connected to an input port of the gate 658. The other input port of the gate 658 is connected to the output port of the flip-flop 654.

FIG. 6 also includes an OR gate 662, an enabling OR gate 666, and a flip-flop 670. The flip-flop 670 is an RS-type flip-flop having a set input port, a reset input port, and a Q output port. As shown in FIG. 6, one input port of the gate 662 is connected to the Start input port. The other of the input ports of the gate 662 is connected to the Finish input port. The output port of the gate 662 is connected to the reset input port of the flip-flop 670. One input port of the gate 666 is connected to an output port of the gate 642. The other of the input ports of the gate 666 is connected to an output port of the gate 658. An output port of the gate 666 is connected to the set input port of flip-flop 670. The Q output port of the flip-flop 670 is connected in parallel to an input port of the gate 648 and an input port of the gate 646.

As shown in FIG. 6, there is included a two-input OR gate 672, a three-input OR gate 674, and a three-input OR gate 675. The circuit also includes a MUX 676 and a delay unit 678. The MUX 676 is a 1-by-4 MUX having four control-signal input ports, a Resource Idle output port, and an Active SRC input port. The two inputs of the gate 672 are connected respectively to the output of the gate 646, and the output of the gate 648. The output of the gate 672 is connected to the increment port 636 of the counter 632.

Two of the three input ports of the gate 674 are connected respectively to the output ports of the gate 646 and the gate 648. A third input of the gate 674 is connected to the output of the delay unit 660. The output of the gate 674 constitutes the Incr Addr output ports.

The three input ports of the gate 675 are connected respectively to the outputs of the gate 646, the gate 648, and gate 650. The output of the gate 675 constitutes the LMMemEn output port.

The output of the delay unit 660 is connected to the CompEn output port. The Reset input port of the counter 632 is connected to the Start input port of the circuit in FIG. 6.

As may be seen in FIG. 6, an input of each of the gates 646, 648, 650 are connected in parallel to the Mem Idle input port 724. The output of the gate 646 is connected to the LmWrEn output port.

FIG. 6 shows one embodiment of the E unit shown in FIG. 5, it being understood that various other logic circuits could accomplish the functions described above.

The foregoing disclosure and description of the invention is illustrative and explanatory thereof, and various changes in the details of the illustrated circuitry may be made within the scope of the appended claims without departing from the spirit of the invention.

In general, parallel processors in which the invention finds applicability are well known in the art. The various elements of the processors described herein can be fabricated using well known application specific integrated circuits or standard semiconductor components such as dynamic random access memories. The apparatus and method disclosed find applicability in video servers, medical imaging, special effects and animation and location based entertainment systems among other applications.

We claim:

1. In a parallel processing computer having a plurality of processors, where each processor is directly connected to a local storage memory, each of said processors comprising:
   a principal processing element (PPE) for executing a series of program instructions including local storage memory access instructions that cause the PPE to produce a local storage memory access request for accessing information within the local storage memory;
   a memory controller, connected to said PPE and a plurality of information resources of the parallel processing computer, for selectively routing local storage memory access requests from said information resources to an output port of said memory controller and for generating an enable flag that is set to a first state when a selected one of said plurality of information resources can access said local storage memory and is set to a second state when said PPE is accessing said local storage, where generating said first state is deferred until said PPE has completed accessing said local storage memory; and multiplexing means, connected to said PPE, said memory controller and said local storage memory, for multiplexing, in response to said enable flag, said PPE access request with said selected information resource access requests, where said first state of said enable flag causes said multiplexing means to permit said selected information resource to access said local storage memory and said second state of said enable flag causes said multiplexing means to permit said PPE to access said local storage memory substantially without time-delay interruption of the execution of program instructions by the PPE; wherein said memory controller further comprises:

a monitor circuit, connected to each of said information resources, for identifying the access requests generated by said information resources and for selecting one of said plurality of information resources to access said local storage memory and for generating, in response to said access request of said selected information resource, a request signal identifying said selected information resource.

2. The processor of claim 1 wherein said memory controller further comprises:

an access circuit, connected to said monitor circuit, for transferring information between the local storage memory and said selected information resource, and where said access circuit generates an access-completed signal for signaling that the transfer of information between said local storage memory and said selected information resource has been completed.

3. The processor of claim 2 wherein said access circuit further comprises:

load logic, connected to said monitor circuit and said plurality of information resources, for generating a memory address for said local storage memory to access information from said local storage memory in response to said access request from said selected information resource, and, if said access request from said information resource is a write request, said load logic passes data from said selected information resource to a data output port of said load logic; and an execution unit, connected to said load logic, for transferring said memory address to said multiplexing means and, if said access request from said selected information resource is a write request, said execution unit passes data from said load logic to said multiplexing means.

4. The processor of claim 3 wherein said load logic further comprises a double buffer for temporarily storing said data until said execution unit produces a ready signal indicating that the execution unit is available for transferring the access request from said selected information resource and data.

5. The processor of claim 4 wherein said double buffers are capable of storing variable length data words, where data words generated by a first information resource has a different length than a data word generated by a second information resource.

6. In a parallel processing computer having a plurality of processors, where each processor is directly connected to a local storage memory and each processor includes a principal processing element (PPE) for executing a series of program instructions including local storage memory access instructions that cause the PPE to produce a local storage memory access request for accessing information within the local storage memory, and a memory controller, connected to said PPE and a plurality of information resources of the parallel processing computer, a method for accessing said local storage memory comprising the steps of:

selectively routing local storage memory access requests from a selected one of said information resources to an output port of said memory controller;

generating an enable flag that is set to a first state when one of said plurality of resources can access said local storage memory and is set to a second state when said PPE is accessing said local storage, where generating said first state is deferred until said PPE has completed accessing said local storage memory; and multiplexing, in response to said enable flag, said PPE access request with said selected information resource access requests, where said first state of said enable flag permits said selected information resource to access said local storage memory and said second state permits said PPE to access said local storage memory substantially without time-delay interruption of the execution of program instructions by the PPE; wherein the method further comprises the steps of:

identifying the access requests generated by said information resources;

selecting an information resource from said plurality of information resources for accessing said local storage memory; and generating, in response to said access request from said selected information resource, a request signal identifying said selected information resource.

7. The method of claim 6 further comprising the steps of:

transferring information between the local storage memory and said selected resource, and generating an access-completed signal for signaling that the transfer of information between said local storage memory and said selected resource has been completed.

8. The method of claim 7 further comprising the steps of:

generating a memory address for said local storage memory to access information from said local storage memory in response to said access request from said selected information resource; and transferring said memory address to said multiplexor and, if said access request is a write request, passing data to said multiplexor.

9. The method of claim 8 further comprising the step of temporarily storing said data in a double buffer until transferring the access request and data.

10. The method of claim 9 wherein said double buffer is capable of storing variable length data words, where data words generated by a first information resource has a different length than a data word generated by a second information resource.

* * * * *